(12) United States Patent
Nishizaki et al.

(10) Patent No.: US 6,442,462 B1
(45) Date of Patent: Aug. 27, 2002

(54) MOTOR VEHICLE STEERING SYSTEM

(75) Inventors: Katsutoshi Nishizaki, Nabari; Shiro Nakano, Chihayaakasaka-mura; Masaya Segawa, Tenri; Ryouhei Hayama, Nabari, all of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/985,063

(22) Filed: Nov. 1, 2001

(30) Foreign Application Priority Data

Nov. 14, 2000 (JP) ........................................ 2000-347081

(51) Int. Cl.[7] ................................................ B62D 5/04
(52) U.S. Cl. .............................. 701/41; 701/42; 701/43; 180/402; 180/446
(58) Field of Search ............................ 701/41, 42, 43; 180/402, 410, 443, 444, 441, 412, 446

(56) References Cited

U.S. PATENT DOCUMENTS 4,869,334 A * 9/1989 Marumoto et al. ......... 180/446
4,940,105 A * 7/1990 Matsunaga et al. ......... 180/404

* cited by examiner

Primary Examiner—William A. Cuchlinski, Jr.
Assistant Examiner—Marthe Y. Marc-Coleman
(74) Attorney, Agent, or Firm—Rabin & Berdo, P.C.

(57) ABSTRACT

A motor vehicle steering system is provided which includes: an operation member for steering a motor vehicle; a steering mechanism for turning steerable wheels of the motor vehicle; a first actuator and a second actuator each operative to apply a driving force to the steering mechanism; and a clutch mechanism operative to mechanically engage and disengage the operation member to or from the steering mechanism. When the first and second actuators operate normally, the clutch mechanism is brought into the disengaged state, and a driving force is applied to the steering mechanism from the first and second actuators and, when one of the first and second actuators malfunctions, the clutch mechanism is brought into the engaged state, and the steering assist force is generated by the other normal actuator in accordance with the operation of the operation member.

5 Claims, 4 Drawing Sheets

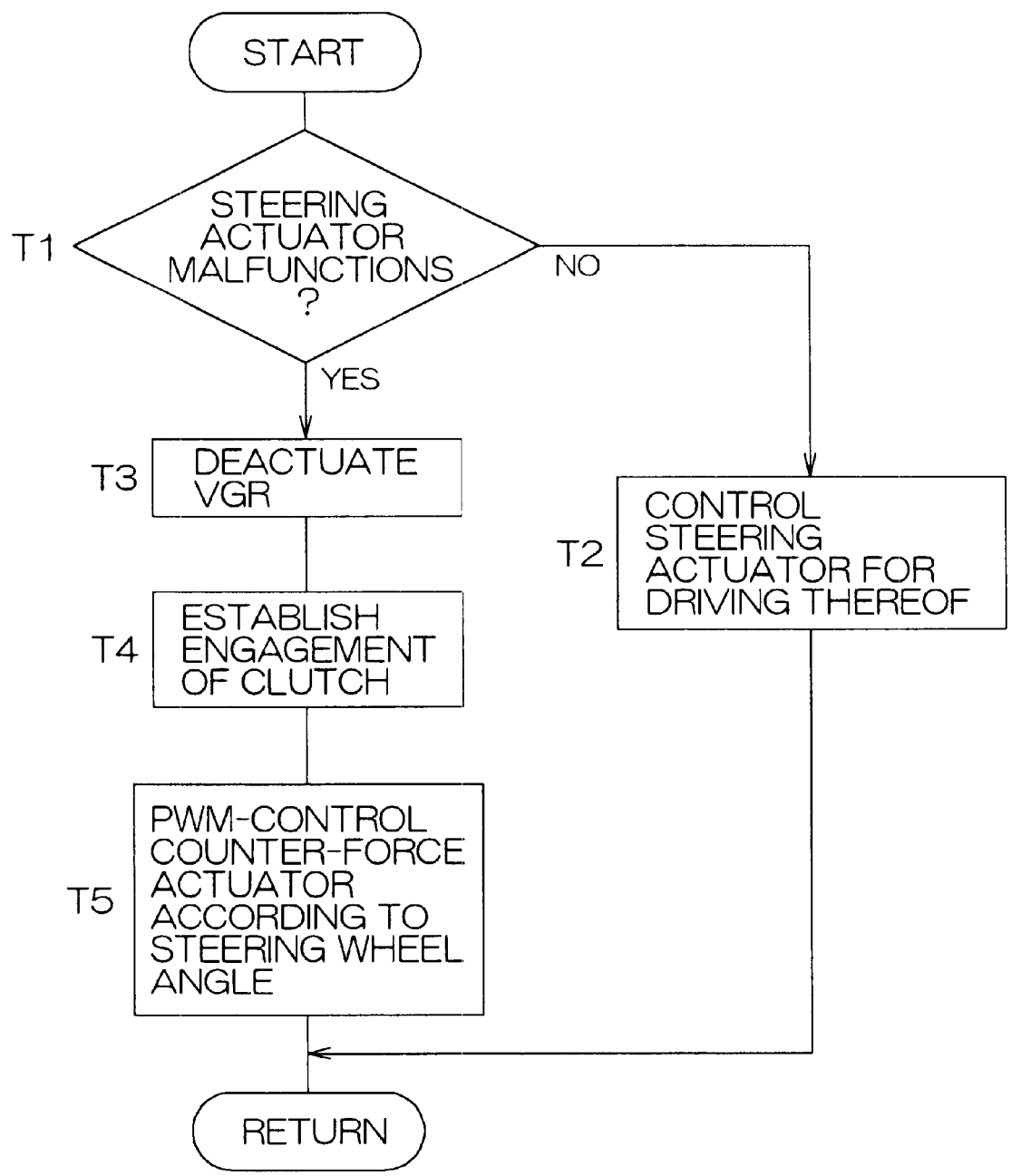

MOTOR VEHICLE STEERING SYSTEM

BACKGROUND OF THE INVENTION

1. Field of the Invention

The present invention relates to a motor vehicle steering system which is adapted to turn steerable vehicle wheels on the basis of the operation of an operation member such as a steering wheel.

2. Description of Related Art

A steering system for a motor vehicle (so-called steer-by-wire system) has been proposed, which has no mechanical coupling between a steering wheel and a steering mechanism for turning steerable vehicle wheels, and is adapted to detect the direction and degree of the operation of the steering wheel and apply a driving force from a steering actuator such as an electric motor to the steering mechanism on the basis of the result of the detection.

This arrangement makes it possible to flexibly change the ratio (gear ratio) of the degree of the rotation of the steering wheel to the degree of the turning of the steerable vehicle wheels depending on the traveling state of the vehicle for improvement of the maneuverability of the motor vehicle. The aforesaid arrangement advantageously prevents upward thrust of the steering wheel in the event of the collision of the motor vehicle, and allows for more flexible placement of the steering wheel.

Since the steer-by-wire system has no mechanical coupling between the steering wheel and the steering mechanism, it is important to give a fail-safe consideration to a steering drive system. To this end, it is proposed to provide a clutch between the steering wheel and the steering mechanism for engagement and disengagement therebetween, whereby a mechanical coupling is established between the steering wheel and the steering mechanism with the clutch brought into engagement in the event of malfunction of the system.

With the clutch interposed between the steering wheel and the steering mechanism, however, there is a possibility that the turning of the steerable vehicle wheels by the steering actuator undesirably causes passive rotation of the steering wheel when the drive control of the steering actuator is continued after the engagement of the clutch. Therefore, the driving of the steering actuator is stopped even if any component other than the steering actuator malfunctions. As a result, the steering wheel feels very heavy after the engagement of the clutch, so that a greater load is exerted on the clutch.

SUMMARY OF THE INVENTION

It is an object of the present invention to provide a motor vehicle steering system which is capable of properly performing a steering operation even if a malfunction occurs.

The motor vehicle steering system according to the present invention comprises: an operation member for steering a motor vehicle; a steering mechanism for turning steerable wheels of the motor vehicle; a first actuator and a second actuator each operative to apply a driving force to the steering mechanism; and a steering control section which, when the first and second actuators operate normally, causes at least one of the first and second actuators to apply the driving force to the steering mechanism and, when one of the first and second actuators malfunctions, causes the other normal actuator to apply the driving force to the steering mechanism.

In accordance with a first aspect of the present invention, more specifically, there is provided a motor vehicle steering system, which comprises: an operation member for steering a motor vehicle; a steering mechanism for turning steerable wheels of the motor vehicle; a primary steering actuator and a secondary steering actuator coupled to the steering mechanism; a clutch mechanism operative to mechanically engage and disengage the operation member with respect to the steering mechanism; and a steering control section which, when the primary steering actuator and the secondary steering actuator operate normally, brings the clutch mechanism into a disengaged state to cause the primary steering actuator and the secondary steering actuator to generate a driving force for driving the steering mechanism and, when one of the primary steering actuator and the secondary steering actuator malfunctions, brings the clutch mechanism into an engaged state to cause the other normal steering actuator to generate a steering assist force according to operation of the operation member.

According to this arrangement, when the primary steering actuator and the secondary steering actuator operate normally, the driving force is applied to the steering mechanism from both of the primary steering actuator and the secondary steering actuator. Even if the primary steering actuator and the secondary steering actuator each have a relatively small maximum output, the driving force can sufficiently be applied to the steering mechanism to properly perform a steering operation.

If one of the primary steering actuator and the secondary steering actuator malfunctions, the clutch mechanism is brought into the engaged state, and the other normal steering actuator is controlled as a source of the steering assist force. Thus, the normal steering actuator applies the steering assist force to the steering mechanism according to the operation of the operation member. Therefore, the operation member can easily be operated even after the engagement of the clutch, allowing for a practical fail-safe steering operation.

The motor vehicle steering system may further comprise a counter-force actuator for applying an operation reaction force to the operation member. In this case, the steering control section is preferably adapted to cause the counter-force actuator to generate an additional steering assist force according to the operation of the operation member when one of the primary steering actuator and the secondary steering actuator malfunctions.

With this arrangement, the counter-force actuator is also controlled as the source of the steering assist force if the primary steering actuator or the secondary steering actuator malfunctions. Thus, a further greater steering assist force can be applied to the steering mechanism, so that the operation member can more easily be operated after the engagement of the clutch mechanism.

Where the motor vehicle steering system further comprises the counter-force actuator for applying the operation reaction force to the operation member, the steering control section is adapted to bring the clutch mechanism into the engaged state to cause the primary steering actuator and the secondary steering actuator to generate the steering assist force according to the operation of the operation member when the counter-force actuator malfunctions.

With this arrangement, the clutch mechanism is brought into the engaged state, and the primary steering actuator and the secondary steering actuator are controlled as the source of the steering assist force if the counter-force actuator malfunctions. Therefore, the operation member (e.g., steering wheel) can easily be operated, allowing for a practical fail-safe steering operation.

In accordance with a second aspect of the present invention, there is provided a motor vehicle steering system, which comprises: an operation member for steering a motor vehicle; a steering mechanism for turning steerable wheels of the motor vehicle; a primary steering actuator and a secondary steering actuator coupled to the steering mechanism and having substantially the same maximum output; and steering control means which, when the primary steering actuator and the secondary steering actuator operate normally, causes the primary steering actuator and the secondary steering actuator to generate a driving force for driving the steering mechanism and, when one of the primary steering actuator and the secondary steering actuator malfunctions, causes the other normal steering actuator to generate the driving force for driving the steering mechanism.

According to the present invention, when the primary steering actuator and the secondary steering actuator operate normally, the driving force is applied to the steering mechanism from both of the primary steering actuator and the secondary steering actuator. Therefore, the maximum outputs of the primary steering actuator and the secondary steering actuator can each be set at a smaller level.

The primary steering actuator and the secondary steering actuator preferably each have a maximum output which is 60% to 70% of an output sufficient to drive the steering mechanism. In this case, the driving force can sufficiently be applied to the steering mechanism to properly perform the steering operation, when the primary steering actuator and the secondary steering actuator operate normally. Even if only one of the primary steering actuator and the secondary steering actuator operates normally, a driving force sufficient to maintain the direction of the steerable vehicle wheels can be applied to the steering mechanism.

In accordance with a third aspect of the present invention, there is provided a motor vehicle steering system, which comprises: an operation member for steering a motor vehicle; a steering mechanism for turning steerable wheels of the motor vehicle; a steering actuator coupled to the steering mechanism; a clutch mechanism operative to mechanically engage and disengage the operation member with respect to the steering mechanism; a counter-force actuator for applying an operation reaction force to the operation member; and a steering control section which, when the steering actuator operates normally, brings the clutch mechanism into a disengaged state to cause the steering actuator to generate a driving force for driving the steering mechanism and, when the steering actuator malfunctions, brings the clutch mechanism into an engaged state to cause the counter-force actuator to generate a steering assist force according to operation of the operation member.

According to the present invention, the clutch mechanism is brought into the engaged state and the counter-force actuator is controlled as a source of the steering assist force, if the steering actuator malfunctions. Thus, the counter-force actuator applies the steering assist force to the steering mechanism according to the operation of the operation member. Therefore, the operation member can easily be operated after the engagement of the clutch mechanism, allowing for a practical fail-safe steering operation.

The foregoing and other objects, features and effects of the present invention will become more apparent from the following description of the preferred embodiments with reference to the attached drawings.

BRIEF DESCRIPTION OF THE DRAWINGS

FIG. 4 is a flow chart for explaining a process to be performed by a steering controlling section provided in the motor vehicle steering system shown in FIG. 3.

DESCRIPTION OF THE PREFERRED EMBODIMENTS

Figure 1:
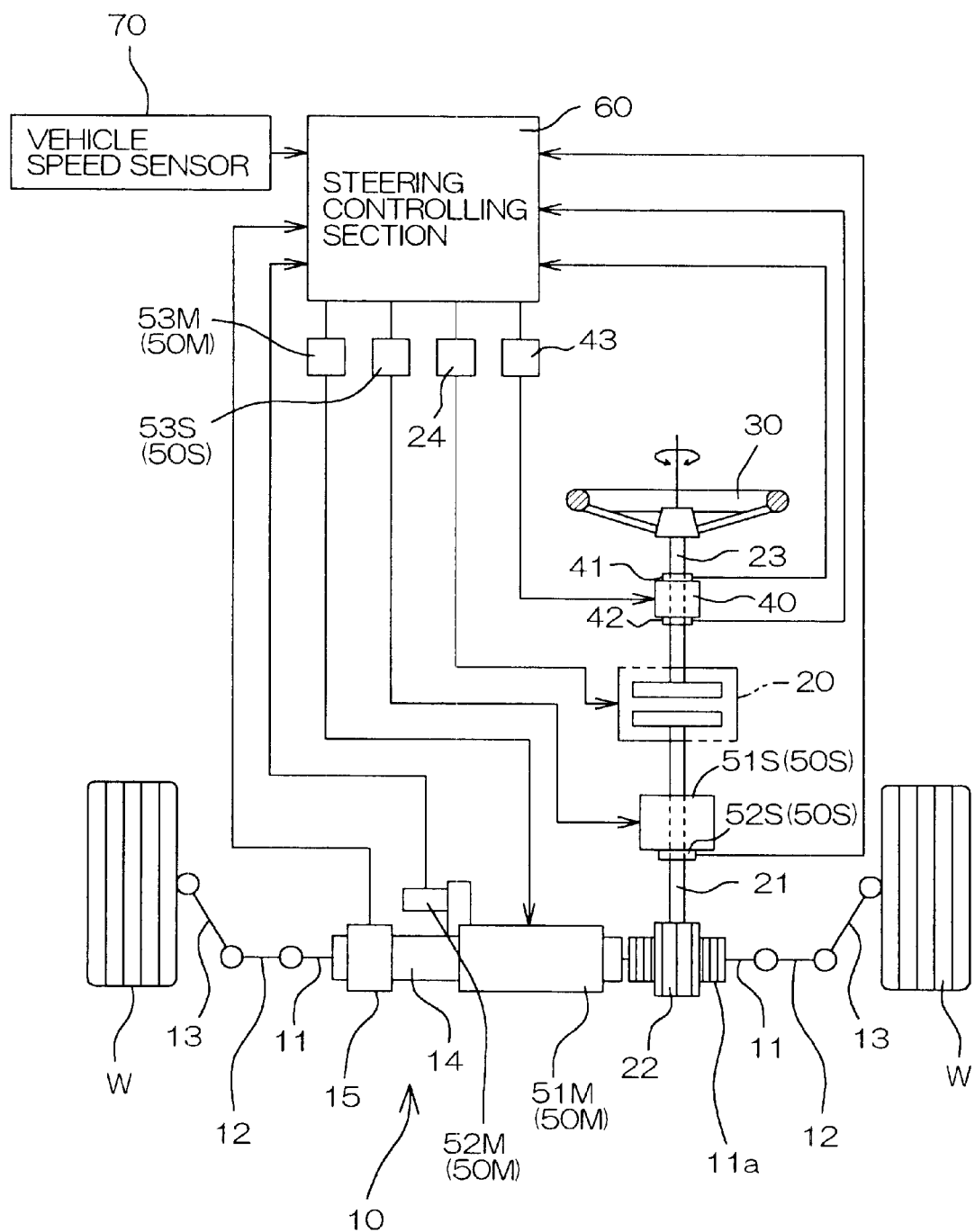
FIG. 1 is a conceptual diagram for explaining the basic construction of a motor vehicle steering system according to one embodiment of the present invention.

FIG. 1 is a conceptual diagram for explaining the basic construction of a steering system for a motor vehicle in accordance with one embodiment of the present invention. The motor vehicle steering system includes a steering mechanism 10 for causing a pair of steerable vehicle wheels (typically, front wheels) W, W to perform a steering operation, a steering wheel 30 to be brought into or out of mechanical engagement with the steering mechanism 10 via a clutch 20, and a counter-force actuator 40 for applying a reaction force to the steering wheel 30.

The motor vehicle steering system has a dual steering drive system including a primary steering drive system 50M and a secondary steering drive system 50S for driving the steering mechanism 10. The primary steering drive system 50M includes a primary steering actuator 51M, and a primary rotation angle sensor 52M for detecting a rotation angle of the primary steering actuator 51M. The secondary steering drive system 50S includes a secondary steering actuator 51S, and a secondary rotation angle sensor 52S for detecting a rotation angle of the secondary steering actuator 51S. The primary steering actuator 51M and the secondary steering actuator 51S each comprise an electric motor, for example, and have substantially the same maximum output which is equal to 60% to 70% of an output sufficient for the primary steering actuator 51M or the secondary steering actuator 51S alone to drive the steering mechanism 10.

The steering mechanism 10 includes a steering shaft 11 extending transversely of a body of the motor vehicle, and knuckle arms 13, 13 respectively coupled to opposite ends of the steering shaft 11 via tie rods 12, 12 for supporting the steerable vehicle wheels W, W. The steering shaft 11 is supported in a housing 14 in an axially slidable manner, and the primary steering actuator 51M is incorporated in the midst of the steering shaft 11 in a coaxial relation.

A rack gear 11a is provided as apart of the steering shaft 11, and meshed with a pinion gear 22 provided at a distal end of a shaft 21 coupled to one side of the clutch 20. The shaft 21 is coupled to the secondary steering actuator 51S, so that a driving force generated by the secondary steering actuator 51S is inputted to the shaft 21.

With this arrangement, when the primary steering actuator 51M is driven, a rotational motion of the primary steering actuator 51M is converted into a sliding motion of the steering shaft 11 by a motion converting mechanism comprising a ball thread and the like, so that the steerable vehicle wheels W, W are turned by the sliding motion of the steering shaft 11. When the secondary steering actuator 51S is driven, a rotational motion of the shaft 21 caused by the secondary steering actuator 51S is converted into the sliding motion of the steering shaft 11 by the pinion gear 22 and the rack gear 11a, so that the steerable vehicle wheels W, W are turned by the sliding motion of the steering shaft 11.

A shaft 23 coupled to the other side of the clutch 20 is coupled to the steering wheel 30. If the clutch 20 is in an engaged state, therefore, a steering torque applied to the steering wheel 30 is mechanically transmitted to the steering shaft 11 via the shaft 23, the clutch 20, the shaft 21, the pinion gear 22 and the rack gear 11a.

The counter-force actuator 40 comprises an electric motor (e.g., three-phase brushless motor) which has a rotation shaft defined by the shaft 23 connecting the clutch 20 to the steering wheel 30 and a casing fixed to an appropriate portion of the vehicle body. The counter-force actuator 40 is provided with a torque sensor 41 for detecting a steering torque inputted from the steering wheel 30, and an operation angle sensor 42 for detecting an operation angle of the steering wheel 30.

The clutch 20, the counter-force actuator 40, the primary steering actuator 51M and the secondary steering actuator 51S are controlled by a steering controlling section 60 which comprises a microprocessor and the like. More specifically, detection signals of the steering angle sensor 42, the primary rotation angle sensor 52M and the secondary rotation angle sensor 52S are inputted to the steering controlling section 60. A steering position sensor 15 for detecting an axial position of the steering shaft 11 is provided in association with the steering shaft 11, and a detection signal of the steering position sensor 15 is also inputted to the steering controlling section 60. Further, a detection signal of a vehicle speed sensor 70 for detecting a vehicle speed is inputted to the steering controlling section 60. The vehicle speed sensor 70 may comprise, for example, a vehicle wheel speed sensor for detecting a rotation speed of each vehicle wheel. The steering controlling section 60 applies control signals to driver circuits 24, 43, 53M, 53S for driving the clutch 20, the counter-force actuator 40, the primary steering actuator 51M and the secondary steering actuator 51S, respectively, on the basis of the signals inputted from the respective sensors.

Figure 2:
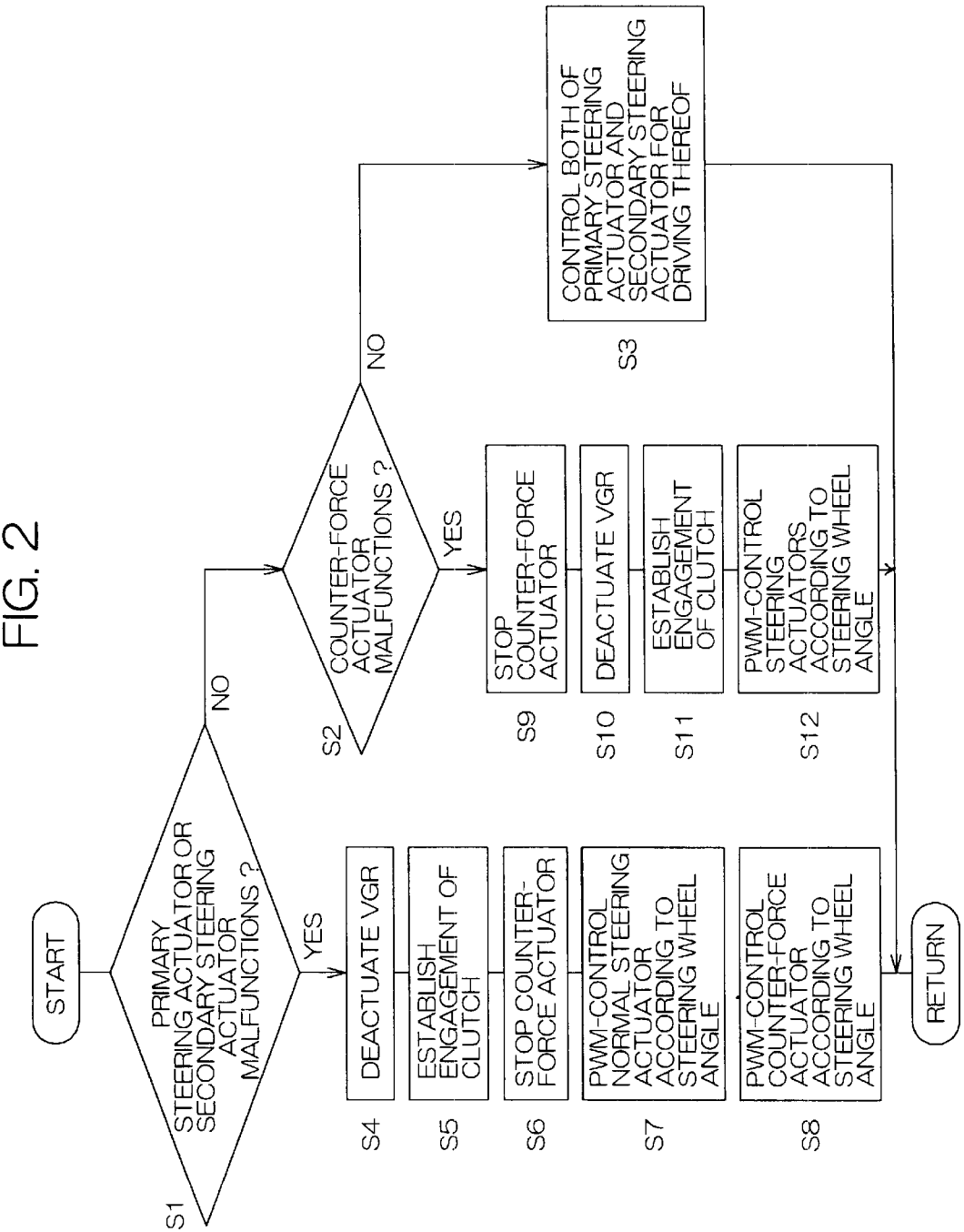
FIG. 2 is a flow chart for explaining a process to be performed by a steering controlling section provided in the motor vehicle steering system shown in FIG. 1.

FIG. 2 is a flow chart for explaining a process to be performed by the steering controlling section 60. The steering controlling section 60 constantly checks if the primary steering actuator 51M, the secondary steering actuator 51S and the counter-force actuator 40 each operate normally, i.e., if any of the primary steering actuator 51M, the secondary steering actuator 51S and the counter-force actuator 40 malfunctions (Step S1, S2).

If neither the primary steering actuator 51M nor the secondary steering actuator 51S malfunctions (NO in Step S1), and if the counter-force actuator 40 does not malfunction (NO in Step S2), the steering controlling section 60 controls the primary steering actuator 51M and the secondary steering actuator 51S for driving thereof (Step S3). In this embodiment, the steering controlling section 60 has a VGR (variable gear ratio) function, and is adapted to set the ratio (gear ratio) of the degree of the rotation of the steering wheel 30 to the degree of the turning of the steerable vehicle wheels W, W according to the traveling state of the motor vehicle. The steering controlling section 60 further sets voltage command values for the primary steering actuator 51M and the secondary steering actuator 51S on the basis of the gear ratio thus set and the degree of the operation of the steering wheel 30, and apply control signals corresponding to the respective voltage command values to the driver circuits 53M, 53S. Thus, torques are respectively outputted from the primary steering actuator 51M and the secondary steering actuator 51S for sliding the steering shaft 11 in a direction corresponding to the direction of the operation of the steering wheel 30, whereby the steering operation is properly performed according to the traveling state of the motor vehicle and the operation of the steering wheel 30.

If one of the primary steering actuator 51M and the secondary steering actuator 51S malfunctions during the drive control thereof, the steering controlling section 60 deactuates the VGR function (Step S4), and controls the other normal steering actuator to adjust the position of the steerable vehicle wheels W, W so that the rotation angle of the steering wheel 30 and the steering angle of the steerable vehicle wheels W, W are brought into a proper relationship (i.e., a relationship where the neutral point of the steering wheel 30 coincides with the neutral point of the steerable vehicle wheels W, W). After the positional adjustment of the steerable vehicle wheels W, W, the engagement of the clutch 20 is established (Step S5), and the driving of the counter-force actuator 40 is stopped (Step S6).

The engagement of the clutch 20 establishes the mechanical coupling between the steering mechanism 10 and the steering wheel 30 and, thereafter, the motor vehicle steering system functions as a power steering system employing the normal steering actuator (the primary steering actuator 51M or the secondary steering actuator 51S) and the counter-force actuator 40 as a source of a steering assist force. That is, after the engagement of the clutch 20, the steering controlling section 60 generates a steering actuator PWM (pulse width modulation) control signal and a counter-force actuator PWM control signal according to the operation angle of the steering wheel 30 (steering wheel angle), and inputs these PWM control signals to the driver circuits of the normal steering actuator and the counter-force actuator 40 so as to cause the normal steering actuator and the counter-force actuator 40 to generate the steering assist force (Steps S7, S8). Thus, the steering assist force is properly generated by the normal steering actuator and the counter-force actuator 40, whereby a steering assist operation can properly be performed according to the operation of the steering wheel 30.

If the counter-force actuator 40 malfunctions, the steering controlling section 60 first stops the driving of the counter-force actuator 40 (Step S9), and then deactuates the VGR function (Step S10). The steering controlling section 60 controls the normal steering actuator to adjust the position of the steerable vehicle wheels W, W so that the rotation angle of the steering wheel 30 and the steering angle of the steerable vehicle wheels W, W are brought into the proper relationship, and then establishes the engagement of the clutch 20 (Step S11)

After the engagement of the clutch 20, the steering mechanism 10 and the steering wheel 30 are mechanically coupled to each other, so that the motor vehicle steering system functions as a power steering system employing the primary steering actuator 51M and the secondary steering actuator 51S as the source of the steering assist force. That is, after the engagement of the clutch 20, the steering controlling section 60 generates a primary steering actuator PWM control signal and a secondary steering actuator PWM control signal according to the operation angle of the steering wheel 30 (steering wheel angle), and inputs these PWM control signals to the driver circuits 53M and 53S of the primary steering actuator 51M and the secondary steering actuator 51S so as to cause the primary steering actuator 51M and the secondary steering actuator 51S to generate the steering assist force (Step S12). Thus, the steering assist force is properly generated by the primary steering actuator 51M and the secondary steering actuator 51S, whereby the steering assist operation can properly be performed according to the operation of the steering wheel 30.

In accordance with this embodiment, as described above, the steering mechanism 10 is driven by both of the primary steering system 50M and the secondary steering system 50S when the counter-force actuator 40, the primary steering actuator 51M and the secondary steering actuator 51S operate normally. Even if the primary steering actuator 51M and the secondary steering actuator 51S each have a relatively small maximum output, therefore, the driving force can sufficiently be applied to the steering mechanism 10, so that the steering operation can properly be performed.

If one of the primary steering actuator 51M and the secondary steering actuator 51S malfunctions, the engagement of the clutch 20 is established, and the other normal steering actuator is PWM-controlled as the source of the steering assist force. Thus, the steering assist force is applied to the steering mechanism 10 from the normal steering actuator according to the operation of the steering wheel 30. Therefore, the steering wheel 30 can easily be operated even after the engagement of the clutch 20, allowing for a practical fail-safe steering operation.

In this embodiment, the counter-force actuator 40 is also PWM-controlled as the source of the steering assist force when the primary steering actuator 51M or the secondary steering actuator 51S malfunctions. This makes it possible to apply a further greater steering assist force to the steering mechanism 10, so that the steering wheel 30 can more easily be operated after the engagement of the clutch 20.

If the counter-force actuator 40 malfunctions, the engagement of the clutch 20 is established, and the primary steering actuator 51M and the secondary steering actuator 51S are PWM-controlled as the source of the steering assist force. Therefore, the steering wheel 30 can easily be operated, allowing for a practical fail-safe steering operation.

Figure 3:
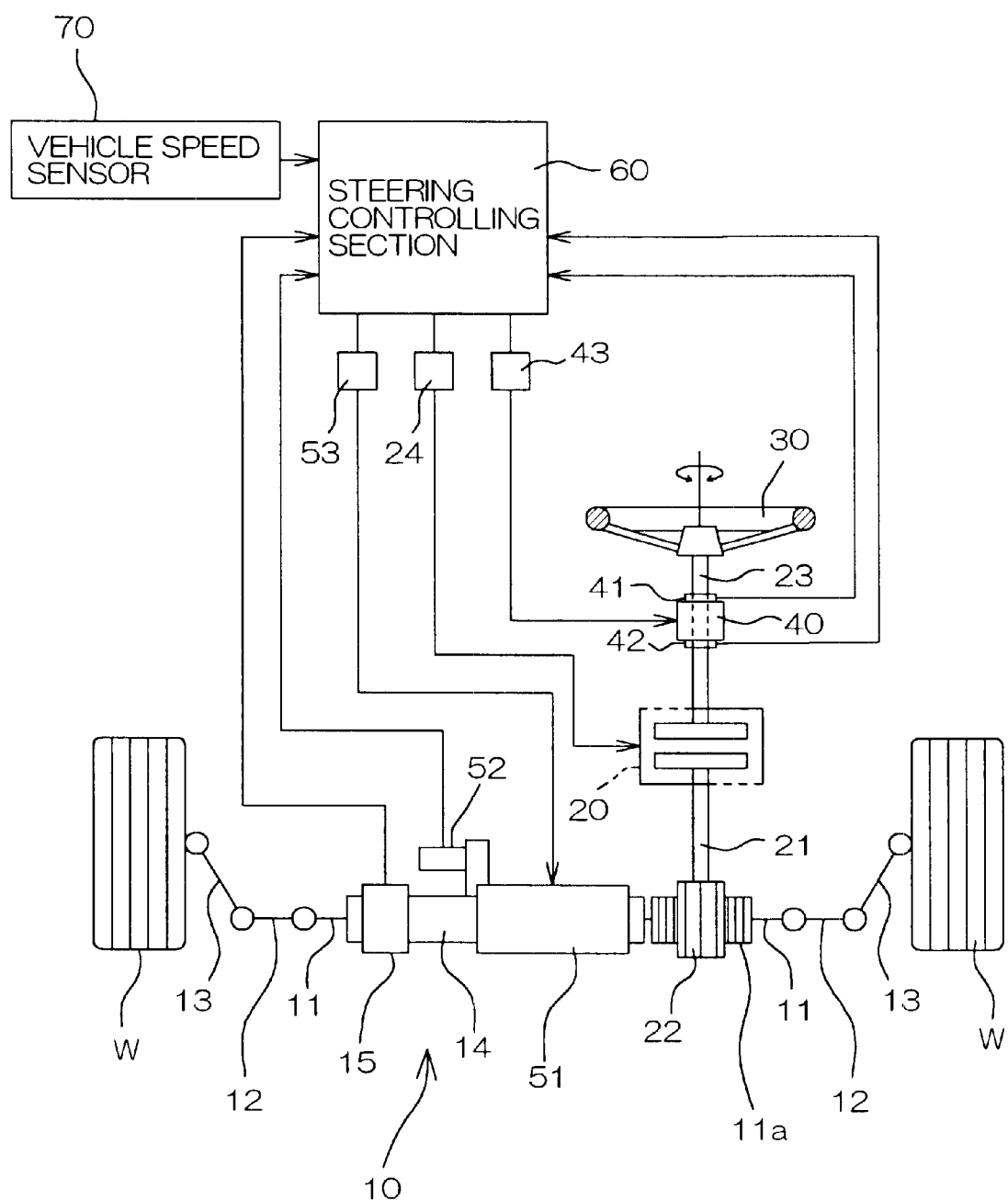
FIG. 3 is a conceptual diagram for explaining the basic construction of a motor vehicle steering system according to another embodiment of the present invention.

FIG. 3 is a conceptual diagram for explaining the basic construction of a steering system for a motor vehicle in accordance with another embodiment of the present invention. The motor vehicle steering system according to this embodiment is different from the motor vehicle steering system shown in FIG. 1 in that the steering drive system for driving the steering mechanism 10 is not a dual system. In FIG. 3, components corresponding to those shown in FIG. 1 are denoted by the same reference characters as in FIG. 1.

The motor vehicle steering system includes a steering mechanism 10 for causing a pair of steerable vehicle wheels (typically, front wheels) W, W to perform a steering operation, a steering wheel 30 to be brought into or out of mechanical engagement with the steering mechanism 10 via a clutch 20, and a counter-force actuator 40 for applying a reaction force to the steering wheel 30.

The steering mechanism 10 includes a steering shaft 11 extending transversely of a body of the motor vehicle, and knuckle arms 13, 13 respectively coupled to opposite ends of the steering shaft 11 via tie rods 12, 12 to support the steerable vehicle wheels W, W. The steering shaft 11 is supported in a housing 14 in an axially slidable manner, and a steering actuator 51 is incorporated in the midst of the steering shaft 11 in a coaxial relation. The steering actuator 51 comprises, for example, an electric motor having an output sufficient to drive the steering mechanism 10. With this arrangement, when the steering actuator 51 is driven, a rotational motion of the steering actuator 51 is converted into a sliding motion of the steering shaft 11 by a motion converting mechanism comprising a ball thread and the like, so that the steerable vehicle wheels W, W are turned by the sliding motion of the steering shaft 11.

A rack gear 11a is provided as a part of the steering shaft 11, and meshed with a pinion gear 22 provided at a distal end of a shaft 21 coupled to one side of the clutch 20. A shaft 23 coupled to the other side of the clutch 20 is coupled to the steering wheel 30. If the clutch 20 is in an engaged state, therefore, a steering torque applied to the steering wheel 30 is mechanically transmitted to the steering shaft 11 via the shaft 23, the clutch 20, the shaft 21, the pinion gear 22 and the rack gear 11a.

The counter-force actuator 40 comprises an electric motor (e.g., three-phase brushless motor) which has a rotation shaft defined by the shaft 23 connecting the clutch 20 to the steering wheel 30 and a casing fixed to an appropriate portion of the vehicle body. The counter-force actuator 40 is provided with a torque sensor 41 for detecting a steering torque inputted from the steering wheel 30, and a steering angle sensor 42 for detecting an operation angle of the steering wheel 30.

The clutch 20, the counter-force actuator 40 and the steering actuator 51 are controlled by a steering controlling section 60 which comprises a microprocessor and the like. More specifically, detection signals of the steering angle sensor 42 and a rotation angle sensor 52 are inputted to the steering controlling section 60. A steering position sensor 15 for detecting an axial position of the steering shaft 11 is provided in association with the steering shaft 11, and a detection signal of the steering position sensor 15 is also inputted to the steering controlling section 60. Further, a detection signal of a vehicle speed sensor 70 for detecting a vehicle speed is inputted to the steering controlling section 60. The vehicle speed sensor 70 may comprise, for example, a vehicle wheel speed sensor for detecting a rotation speed of each vehicle wheel. The steering controlling section 60 applies control signals to driver circuits 24, 43, 53 for driving the clutch 20, the counter-force actuator 40 and the steering actuator 51, respectively, on the basis of the signals inputted from the respective sensors.

FIG. 4 is a flow chart for explaining a process to be performed by the steering controlling section 60. The steering controlling section 60 constantly checks if the steering actuator 51 operates normally (Step T1)

If the steering actuator 51 does not malfunction, the steering controlling section 60, for example, sets the gear ratio of the degree of the rotation of the steering wheel 30 to the degree of the turning of the steerable vehicle wheels W, W according to the traveling state of the motor vehicle (VGR function). The steering controlling section 60 further sets a voltage command value for the steering actuator 51 on the basis of the gear ratio thus set and the degree of the operation of the steering wheel 30, and applies a control signal corresponding to the voltage command value to the driver circuit 53 (Step T2). Thus, a torque is outputted from the steering actuator 51 for sliding the steering shaft 11 in a direction corresponding to the direction of the operation of the steering wheel 30, whereby the steering operation is properly performed according to the traveling state of the motor vehicle and the operation of the steering wheel 30.

If the steering actuator 51 malfunctions during the drive control thereof, the steering controlling section 60 deactuates the VGR function (Step T4), and establishes the engagement of the clutch 20 (Step T3).

The engagement of the clutch 20 establishes the mechanical coupling between the steering mechanism 10 and the steering wheel 30 and, thereafter, the motor vehicle steering system functions as a power steering system employing the counter-force actuator 40 as a source of a steering assist force. That is, after the engagement of the clutch 20, the steering controlling section 60 generates a PWM control signal according to the operation angle of the steering wheel 30 (steering wheel angle), and inputs the PWM control signal to the driver circuit 43 of the counter-force actuator 40 so as to cause the counter-force actuator 40 to generate the steering assist force (Step T5). Thus, the steering assist force is properly generated by the counter-force actuator 40, whereby a steering assist operation can properly be performed according to the operation of the steering wheel 30.

In accordance with this embodiment, the engagement of the clutch 20 is established and the counter-force actuator 40 is PWM-controlled as the source of the steering assist force, if the steering actuator 51 malfunctions. Thus, the steering assist force is applied to the steering mechanism 10 from the counter-force actuator 40 according to the operation of the steering wheel 30. Therefore, the steering wheel 30 can easily be operated even after the engagement of the clutch 20, allowing for a practical fail-safe steering operation.

While the two specific embodiments of the present invention have thus been described, the invention may be embodied in any other ways. In accordance with the invention, the primary steering actuator 51M and the secondary steering actuator 51S are designed so as to have substantially the same maximum output and to be both controlled for driving thereof when the primary steering actuator 51M and the secondary steering actuator 51S operate normally. This arrangement is applied not only to the motor vehicle steering system according to the first embodiment but also to a motor vehicle steering system in which a steering drive system for driving the steering mechanism 10 is a dual drive system and no clutch 20 is provided. In this case, the motor vehicle steering system may be constructed so that, when the primary steering actuator 51M and the secondary steering actuator 51S operate normally, the driving force for driving the steering mechanism 10 is generated by both of the primary steering actuator 51M and the secondary steering actuator 51S and, when one of the primary steering actuator 51M and the secondary steering actuator 51S malfunctions, the driving force for driving the steering mechanism 10 is generated by the other normal steering actuator alone.

Although the steering wheel 30 is employed as the operation member in the embodiments described above, a lever and the like may be employed as the operation member.

While the present invention has been described in detail by way of the embodiments thereof, it should be understood that the foregoing disclosure is merely illustrative of the technical principles of the present invention but not limitative of the same. The spirit and scope of the present invention are to be limited only by the appended claims.

This application corresponds to Japanese Patent Application No. 2000-347081 filed to the Japanese Patent Office on Nov. 14, 2000, the disclosure thereof being incorporated herein by reference.

What is claimed is:

1. A motor vehicle steering system comprising:
   an operation member for steering a motor vehicle;
   a steering mechanism for turning steerable wheels of the motor vehicle;
   a first actuator and a second actuator each operative to apply a driving force to the steering mechanism;
   a clutch mechanism operative to mechanically engage and disengage the operation member with respect to the steering mechanism; and
   a steering control section which, when the first and second actuators operate normally, brings the clutch mechanism into a disengaged state and causes the first and second actuators to generate the driving force for driving the steering mechanism and, when one of the first and second actuators malfunctions, brings the clutch mechanism into an engaged state and causes the other normal actuator to generate a steering assist force according to operation of the operation member.

2. A motor vehicle steering system as set forth in claim 1,
   wherein the first actuator is a primary steering actuator coupled to the steering mechanism; and
   wherein the second actuator is a secondary steering actuator coupled to the steering mechanism.

3. A motor vehicle steering system as set forth in claim 2, further comprising a counter-force actuator for applying an operation reaction force to the operation member,
   wherein, when one of the primary steering actuator and the secondary steering actuator malfunctions, the steering control section causes the counter-force actuator to generate an additional steering assist force according to the operation of the operation member.

4. A motor vehicle steering system as set forth in claim 2, further comprising a counter-force actuator for applying an operation reaction force to the operation member,
   wherein, when the counter-force actuator malfunctions, the steering control section brings the clutch mechanism into the engaged state to cause the primary steering actuator and the secondary steering actuator to generate the steering assist force according to the operation of the operation member.

5. A motor vehicle steering system as set forth in claim 1,
   wherein the first actuator is a steering actuator coupled to the steering mechanism;
   wherein the second actuator is a counter-force actuator for applying an operation reaction force to the operation member; and
   wherein, when the steering actuator operates normally, the steering control section brings the clutch mechanism into a disengaged state and causes the steering actuator to generate the driving force for driving the steering mechanism and, when the steering actuator malfunctions, brings the clutch mechanism into an engaged state and causes the counter-force actuator to generate a steering assist force according to operation of the operation member.

* * * * *